United States Patent [19]

Keem

[11] 4,254,354
[45] Mar. 3, 1981

[54] INTERACTIVE PIEZOELECTRIC KNOCK SENSOR

[75] Inventor: John E. Keem, Grosse Pointe Farms, Mich.

[73] Assignee: General Motors Corporation, Detroit, Mich.

[21] Appl. No.: 53,843

[22] Filed: Jul. 2, 1979

[51] Int. Cl.³ .............................................. H01L 41/08
[52] U.S. Cl. .................................... 310/329; 310/321; 310/330; 310/338; 73/35
[58] Field of Search ............... 310/329, 330, 338, 321; 73/35, 570, 587, 652, 658, 660

[56] References Cited

U.S. PATENT DOCUMENTS

| 2,808,522 | 10/1957 | Dranetz | 310/329 X |
|---|---|---|---|
| 3,060,748 | 10/1962 | Schwartz | 310/329 X |
| 3,120,622 | 2/1964 | Dranetz et al. | 310/329 |
| 3,148,290 | 9/1964 | Dranetz et al. | 310/329 |
| 3,170,076 | 2/1965 | Wing | 310/329 X |
| 3,311,761 | 3/1967 | Schloss | 310/329 |
| 3,453,457 | 7/1969 | Hayer et al. | 310/329 X |
| 3,846,650 | 11/1974 | Barrow | 310/324 X |
| 4,015,319 | 4/1977 | Levine | 310/324 X |
| 4,161,665 | 7/1979 | Buck et al. | 310/26 |

Primary Examiner—Mark O. Budd
Attorney, Agent, or Firm—Robert M. Sigler

[57] ABSTRACT

A piezoelectric knock sensor comprises a flexing plate at one end of a generally cylindrical case with a mounting stud extending perpendicularly therefrom and a piezoelectric element attached to the flexing plate within the case for flexure with the flexing plate. When the sensor is attached to a component of a multicylinder, internal combustion engine, the case vibrates interactively with at least a portion of the component through the flexing plate and exhibits both an interactive resonance with the component for a wide resonance peak and response to transverse as well as axial vibrations. The sensor is thus capable of resonant response to knock-induced vibrations from all the cylinders even if the characteristic knock frequencies of the individual cylinders differ over a range too great to be encompassed by a self-resonant sensor. In addition, the sensor has the comparatively high output level of a piezoelectric device and simple construction suitable for mass production.

2 Claims, 11 Drawing Figures

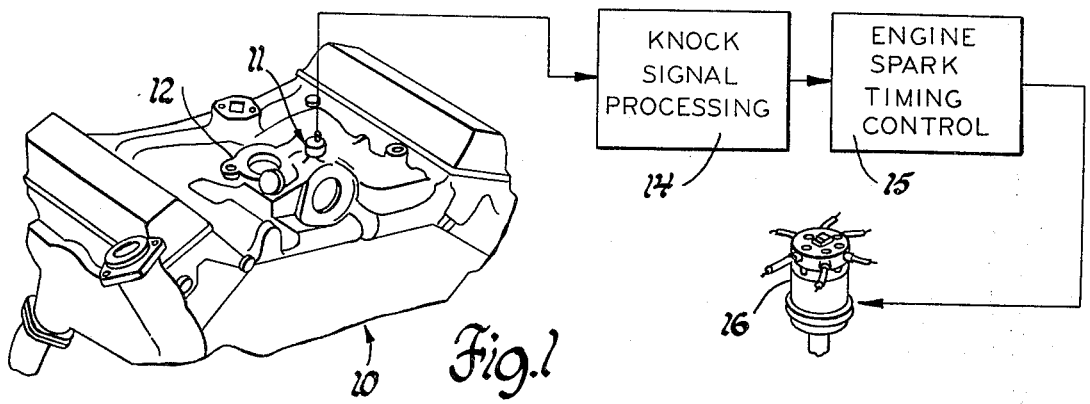
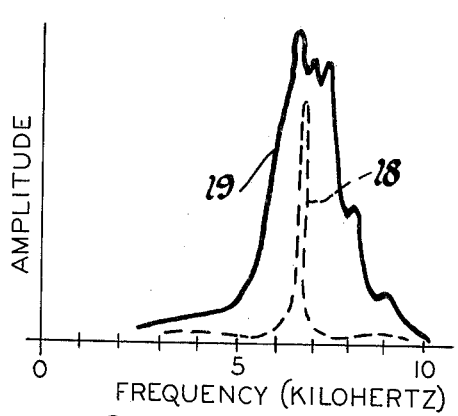
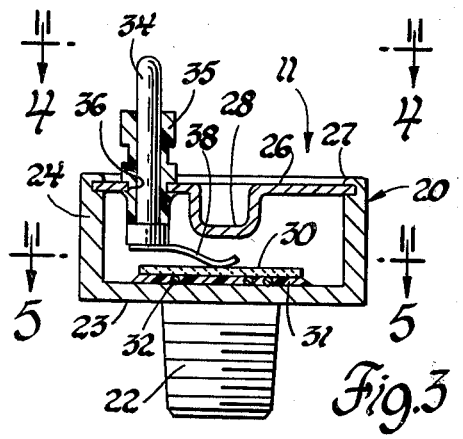
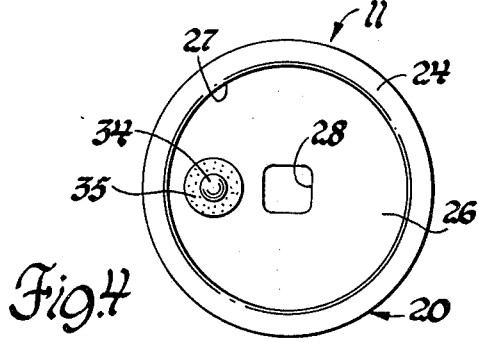
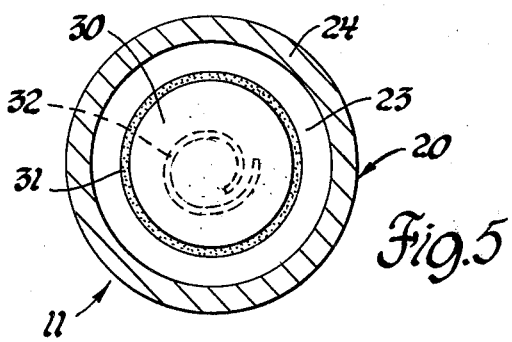
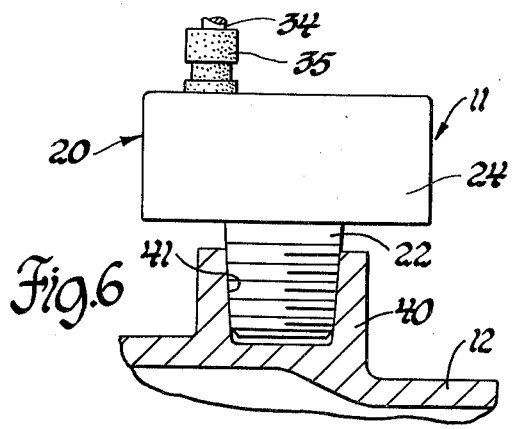
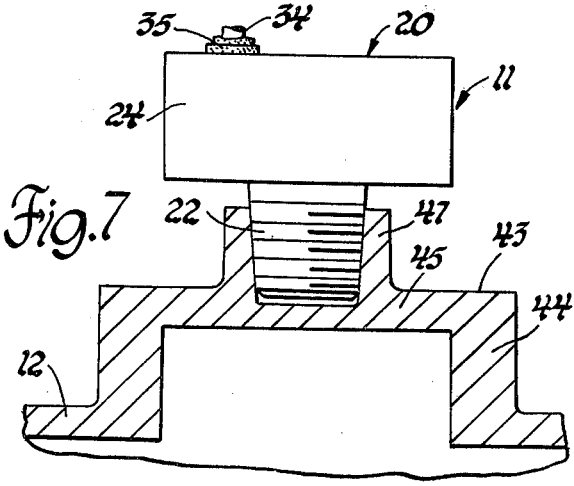

INTERACTIVE PIEZOELECTRIC KNOCK SENSOR

BACKGROUND OF THE INVENTION

This invention relates to knock sensors for use with multicylinder internal combustion engines. Such sensors are especially useful as part of a closed loop knock control system for such engines in which the ignition timing or some other engine operating variable is controlled in response to the output signal of such sensor to prevent excessive engine knock. Such sensors generally utilize magnetostrictive or piezoelectric elements combined with inertial masses to convert vibration induced strains on the elements into electrical output signals. Such sensors are generally mounted on an engine component in order to vibrate therewith and thus generate output signals representative of engine vibrations, including knock-induced vibrations.

Most such knock sensors known in the prior art have proven unsatisfactory for use in a practical knock control system on mass produced automotive engines. Some of such sensors are broadband sensors, in which output signal strength is substantially independent of vibration frequency over a very wide range of such frequencies. Such sensors are generally far too expensive for practical use on a mass production basis and are more suitable for experimental purposes in laboratories. In addition, the wide frequency response of broadband sensors results in too much output information at frequencies outside the general range of frequencies characteristic of knock-induced vibrations with a consequently poor signal-to-noise ratio, which can only be improved with electronic filtering. Since multicylinder internal combustion engines tend to generate significant amounts of vibrations other than those associated with knock, the signal-to-noise ratio of a knock sensor output signal generally requires as much improvement as possible.

One way, well known to those skilled in the art, of improving the signal-to-noise ratio of a knock sensor is the use of a sensor design with a mechanical resonance at a frequency associated with knock-induced vibrations to boost the signal strength of vibrations at that frequency relative to vibrations at other frequencies. In the knowledge of the inventor, this has always been done, with one exception to be described below, with a self-resonant sensor: that is, a sensor which resonates at a constant resonant frequency regardless of differences in the mass or other characteristics associated with the different modes of vibration of the object upon which it is mounted. A typical example of such a sensor uses a piezoelectric element mounted on a pedestal which is in turn fixed to a mounting stud for attachment to an engine component. A case, also attached to the mounting stud, may surround the pedestal and piexoelectric element, but is designed so as not to affect the resonant frequency of the pedestal. Such a sensor may be designed with a sharp, high "Q" resonance at a predetermined frequency and will provide a signal with a reasonably high signal-to-noise ratio at that frequency. Unfortunately, the frequency range of such a device is generally too narrow for practical application with a multicylinder internal combustion engine, since each cylinder of the engine may have its own characteristic knock frequency. The knock frequency of each cylinder is determined by the specific components associated with that cylinder; and since said components are similar from one cylinder to another, the individual knock frequencies tend to lie within a certain range of frequencies. However, there are slight differences in the normal manufacture of such components or design of the engine from cylinder to cylinder which often produce characteristic resonant frequencies in different cylinders of the same engine which are too far apart to be contained within the response of such a high "Q", self resonant knock sensor. If the response of the sensor is damped sufficiently to broaden the frequency range, the "Q" of the sensor, or the ratio of resonant to nonresonant amplitudes, is generally reduced so much that the sensor provides very little signal-to-noise ratio improvement.

There is one prior art knock sensor within the knowledge of the inventor which has proven practical for mass production use with multicylinder internal combustion engines. This sensor is produced by the assignee of this invention and used, at the time of the filing of this patent application, with certain turbocharged V-6 engines used on some vehicles also produced by the assignee of this invention. The sensor is a magnetostrictive sensor in which a magnetostrictive element axially in line with a mounting stud is subjected to an axial load through the case, which load varies with axial vibrations thereof. Electrical current through a coil surrounding the magnetostrictive element is thus caused to vary with such vibrations. This inventor has found that this particular sensor is not self-resonant: that is, although it exhibits a resonant frequency when mounted on an object, that resonant frequency changes over a range of frequencies in a predictable manner as the mass or equivalent mass of the object to which it is attached is varied—the sensor and object exhibit "interactive resonance". When that object is the intake manifold of a multicylinder internal combustion engine, this sensor exhibits a resonant response which combines a high ratio of signal output in the resonant region to signal output in the nonresonant region with a resonant frequency response that is significantly wider than that of a self resonant sensor. The frequency range of the former resonant response is sufficiently wide to cover at least the cylinder to cylinder variations of characteristic knock frequency associated with the V-6 engine on which it is used.

However, although this sensor is significantly less expensive than the aforementioned broadband sensors, it is still sufficiently complex in its structure to make a less expensive knock sensor desirable for mass production use. In addition, this sensor responds mainly to vibrations parallel to the axis of its mounting stud and thereby may ignore significant knock information which might exist in the form of vibrations transverse to this axis. Therefore, a less expensive knock sensor which is interactive in resonance with an engine component on which it is mounted and responds to transverse as well as axial vibrations would be desirable. Such a sensor utilizing a piezoelectric element shows promise of being simpler in structure than a magnetostrictive sensor and therefore perhaps less expensive to manufacture. In addition, the higher amplitude output of a piezoelectric device provides further advantages.

SUMMARY OF THE INVENTION

It is therefore an object of this invention to provide a simple, inexpensive piezoelectric knock sensor capable of resonant response, when mounted on a component of a multicylinder internal combustion engine, to knock vibrations in a frequency range sufficiently wide to include such vibrations from each cylinder of the engine but exhibiting good suppression of vibration signals outside this range.

It is a further object of this invention to provide a piezoelectric knock sensor for a multicylinder internal combustion engine which is interactive in resonance with a portion of the engine component upon which it is mounted.

It is yet another object of this invention to provide a piezoelectric knock sensor for a multicylinder internal combustion engine which has resonant modes of vibration transverse to the axis of its mounting stud as well as axial to said axis so that it is capable of responding resonantly to knock vibrations in any direction.

These and other objects are attained in a piezoelectric knock sensor comprising a flexing plate adapted to execute plate vibrations in a plurality of modes, a mounting stud extending perpendicularly from a portion of the flexing plate and adapted for threaded attachment to an engine component, a cover affixed to the periphery of the flexing plate and a piezoelectric element attached to the flexing plate and covering a substantial portion of the flexing area thereof. The cover has an inertial mass adapted to interact with the engine component through the flexing plate to execute resonant interactive vibrations over a substantial frequency range at least equal to the range of frequencies characteristic of knock vibrations in the different cylinders of the engine. In addition, the mass of the cover has a center which does not correspond with the center of mass of the flexing plate, so that the cover and the portion of the manifold vibrate resonantly through the flexing plate in modes transverse as well as axial with respect to the mounting stud.

Further details and advantages of this invention will be apparent from the accompanying drawings and following description of a preferred embodiment.

SUMMARY OF THE DRAWINGS

FIG. 1 is a schematic and block diagram of a multicylinder internal combustion engine provided with a closed loop knock control system utilizing the sensor of this invention. FIG. 2 is a graph comparing the amplitude versus frequency response of a sample sensor of this invention with the typical response of a self-resonant knock sensor.

FIG. 3 is a cutaway side view of a preferred embodiment of the sensor of this invention.

FIG. 4 is a view along lines 4—4 in FIG. 3.

FIG. 5 is a section view along lines 5—5 in FIG. 3.

FIG. 6 is a side view, partially elevational and partially cutaway, of one method of mounting the sensor of FIG. 3 on an engine intake manifold.

FIG. 7 is a side view, partially elevational and partially cutaway, of an alternative method of mounting a sensor of FIG. 3 on an engine intake manifold.

DESCRIPTION OF THE PREFERRED EMBODIMENT

Figure 8:
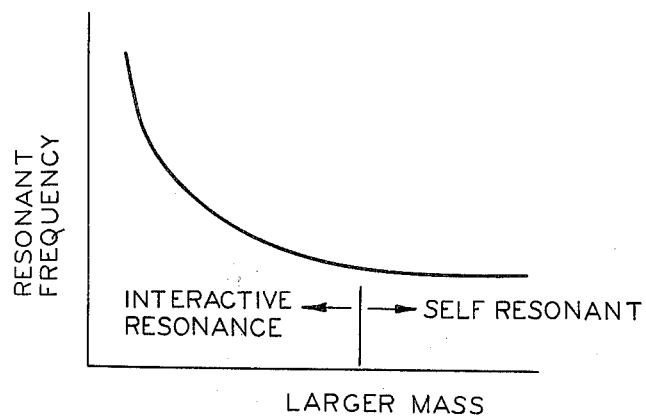
FIG. 8 shows a graph of resonant frequency vs larger mass for a two mass and spring system illustrating interactive resonance.

Referring to FIG. 1, a spark ignited, multicylinder, internal combustion engine 10 is shown in part, with some components removed to give a clearer view of the mounting of a knock sensor 11 on an intake manifold 12. Although this invention is not restricted to any particular engine, the specific engine shown is a 3.9 liter V-6 engine manufactured by the assignee of this invention. Intake manifold 12 is not the only engine component upon which knock sensor 11 can be mounted, however, it is a convenient mounting location and has been used on those vehicles manufactured by the assignee of this invention and equipped with magnetostrictive knock sensors.

The output signal from the knock sensor 11 may be supplied, as indicated in FIG. 1, to a knock signal processing circuit 14, which receives the raw sensor signal and transforms it into a processed signal suitable for application to an engine spark timing control 15. The output of engine spark timing control 15 comprises the actual spark generating signals which are applied through a distributor 16 to the proper engine spark plugs, not shown. Apparatus suitable for use as the knock signal processing circuit 14 is shown in the U.S. patent to Gene A. West et al U.S. Pat. No. 4,111,035, issued Sept. 5, 1978. Apparatus suitable for use as engine spark timing control 15 is shown in the U.S. Pat. No. 4,106,447, granted to Gene A. West on Aug. 15, 1978. Additional portions of engine spark timing control 15 are shown in the U.S. patent to Richards et al U.S. Pat. No. 3,828,672, issued Oct. 1, 1974; while distributor 16 is shown in the U.S. Pat. No. 3,254,247 to Falge, which issued May 31, 1966. Of course, other systems having a knock controlling effect on the engine may also be used with knock sensor 11. Such systems may involve alcohol or water injection or exhaust gas recirculation, for example.

In the general operation of the system of FIG. 1, the engine spark timing control 15 normally times the spark firing events of engine 10 in accordance with a basic predetermined timing as modified by engine speed and load. However, significant knock induced engine vibrations sensed by knock sensor 11 produce an output signal from knock signal processing circuit 14 to engine spark timing control 15 to retard the spark timing of engine 10 from the normal spark timing in closed loop fashion in order to prevent the knock vibrations from exceeding an acceptable level of intensity. The purpose of the system is not necessarily to eliminate knock entirely, since this would require such retard as to waste a significant amount of the power and fuel economy of engine 10, but to prevent the knock intensity from reaching a level which would be unacceptable to the occupant of a vehicle in which engine 10 is mounted or might possibly be damaging to the engine 10.

As a result of knock events in the cylinders of engine 10, engine components in and around each cylinder in which a knock event occurs are caused to vibrate in a ringing manner at characteristic resonant frequencies determined by their own structure. Each cylinder involves separate components which, although similar in structure, are seldom precisely the same. Therefore, each cylinder may have a slightly different resonant frequency or group of resonant frequencies associated with knock events in that cylinder. These resonant ringing vibrations are transmitted throughout the engine structure, including the engine block, intake manifold and other components, along with other vibrations generated by events such as valve closing movements, normal combustion events and all the other vibration producing events in the engine 10. The total amalgam of vibrations ringing in an engine component of engine 10 is such that, from the standpoint of sensing signals at the characteristic knock frequencies only, a sensor with a completely flat response would have a rather poor signal-to-noise ratio. It is generally thought desirable to provide some degree of frequency discrimination and, if this can be accomplished in an inexpensive sensor, that sensor may replace a significant amount of electronic filter circuitry in knock signal processing circuit 14. However, because of the varying characteristic knock frequencies of each cylinder, it is important not to discriminate in frequency too narrowly, or the knock vibrations produced by a particular cylinder at a frequency outside the narrow bandpass of the sensor may be missed. If this cylinder is knocking with significant intensity as compared with the other cylinders whose knock is sensed, a result may be an occasional significant audible knock from engine 10 even during the operation of the system of FIG. 1.

Referring to FIG. 2, the dashed line 18 shows a typical response of amplitude as a function of frequency for a commercially available piezoelectric self-resonant knock sensor. Such a sensor typically has a piezoelectric element mounted on an internal pedestal which is isolated from the standpoint of resonance from the rest of the sensor and engine structure so that the resonant frequency of the sensor does not change with mass differences in said other structure or with the different modes of vibration of such other structure. The curve indicates a resonant frequency of approximately 6.7 kilohertz, which is a typical characteristic knock frequency associated with an engine such as engine 10. However, the manufacturers of such sensors will make them resonant at any comparable frequency specified, although the relative frequency range of resonant response will not be significantly greater at any other chosen resonant frequency. It can be seen in FIG. 2 that the self-resonant sensor has a high "Q" with a narrow resonant frequency range. Thus, this sensor will exhibit a greatly improved signal-to-noise ratio over the narrow frequency range of approximately 6.5 to 6.9 kilohertz. However, it has been determined that a frequency range of this extent is often too narrow, to cover the characteristic knock frequencies of all cylinders of a particular sample of an engine such as engine 10. Although an occasional particular sample of an engine may happen to have a characteristic knock frequency from each knocking cylinder which falls within such a narrow frequency range, this is unlikely to be the case in all samples of the engine produced by mass production techniques at reasonable cost.

Solid line 19 of FIG. 2, on the other hand, is one typical example of an amplitude versus frequency response curve for a piezoelectric knock sensor according to this invention when it is mounted on intake manifold 12. It can be seen that there is a significant resonant response within a defined frequency range of approximately 5.5 to 8.5 kilohertz with good suppression of signals outside this band. It is the experience of this inventor that such a range of frequencies, in contrast to that of the self-resonant sensor, is likely to include at least one characteristic knock frequency of each knocking cylinder of an engine produced under mass production techniques. Therefore, such a sensor, providing it is simple, durable and inexpensive to produce, shows great improvement over the self-resonant piezoelectric sensors in a system such as that shown in FIG. 1.

The basic structure of knock sensor 11 is shown in FIGS. 3–5. Referring to FIG. 3, a case member 20 comprises a mounting stud 22, a flexible plate 23 and an annular riser 24. Mounting stud 22 is threaded for attachment to a component of engine 10 such as manifold 12 and extends substantially perpendicularly from one side of flexible plate 23. In this preferred embodiment of the invention, mounting stud 22 is substantially coaxial with flexible plate 23; and this aids in the construction of case member 20 if it is desired to form member 20 out of one piece of steel stock. However, mounting stud 22 could, within the scope of this invention, be mounted off center or even at the periphery of flexible plate 23. Annular riser 24 is attached to flexible plate 23 around the periphery thereof and is shown as being substantially coaxial with both flexible plate 23 and mounting stud 22. In this embodiment, flexible plate 23 is basically a circular, disk-like plate and annular riser 24 is cylindrical. However, in another embodiment of this invention, the annular riser 24, as well as flexible plate 23, has an outer periphery which is basically hexagonal in shape to facilitate the application of a wrench to screw the sensor into an appropriately threaded recess in manifold 12.

Flexible plate 23 and annular riser 24 define a volume which is closed by a top member 26, which may be stamped from sheet steel and retained on annular riser 24 by crimping as shown at 27. Top member 26 may include a recessed square indentation 28 to receive a wrench for attaching sensor 11 to manifold 12 if annular riser 24 is cylindrical as shown in FIGS. 4 and 5.

A flat piezoelectric member or disk 30 is affixed, within the enclosed volume created by annular riser 24 and top member 26, to flexible plate 23 by means such as an epoxy resin or solder layer 31 or alternatively by appropriate screws with a retaining insulating washer. Piezoelectric element 30 covers a substantial portion of the flexing area of flexing plate 23, where the flexing area is defined as that area of flexing plate 23 which undergoes deformation and flexing and thus causes similar flexing in piezoelectric element 30 with the application of vibrations to sensor 11. It can be seen from FIG. 3 that such flexing area would generally start at approximately the periphery of the mounting stud and extend probably to the periphery of flexing plate 23. It is not necessary that this entire area be covered by piezoelectric element 30, however enough of it must be to provide significant transformation of the flexing of plate 23 to piezoelectric element 30. In general, the amount of flexing area covered may affect both the output amplitude and resonant frequencies of sensor 11 and is therefore a design factor to be considered for a particular embodiment of sensor 11.

Figures 9, 10:
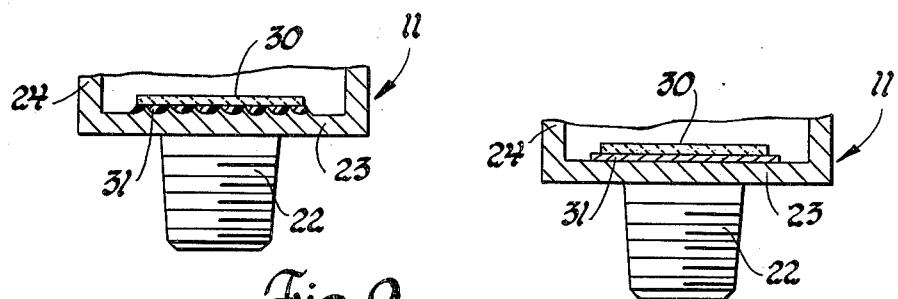
FIGS. 9 and 10 are partial cutaway views of alternate embodiments of the sensor of FIG. 3.

A ground connection for piezoelectric element 30 is provided between the bottom side of that element and flexible plate 23, by a coiled conducting wire 32 pressed therebetween and held by epoxy layer 31. This wire provides electrical contact between the underside of piezoelectric element 30 and case member 20, which is grounded to the engine 10. Alternatively, any other conducting arrangement could be inserted between piezoelectric element 30 and flexible plate 23; or the surface of flexible plate 23 could be roughened into a series of alternating projections and valleys with the projections contacting the underside of piezoelectric element 30 as shown in FIG. 9. If an electrically conducting solder is used for layer 31, electrical contact will be established without additional conducting members, as shown in FIG. 10. Many other contact arrangements will be apparent to those skilled in the art.

To provide electrical connection for the output signal from piezoelectric element 30, a conducting terminal member 34 contained in an insulator 35 projects through, and is retained in, an opening 36 in top member 26. The bottom of terminal member 34 is connected to the top surface of piezoelectric element 30 by a spring member 38, which is biased against the top surface of piezoelectric element 30. Many alternate designs, other than that shown, for these elements 34–38 are possible within the scope of the invention.

In a description of the physical properties of sensor 11 which produce the desired result of the broad resonant frequency range, it is convenient to describe sensor 11 in terms of four basic components: mounting stud 22, flexible plate 23, piezoelectric element 30, and elements defining a cover for flexible plate 23, which elements include annular riser 24, top member 26, terminal member 34 and insulator 35. Basically, sensor 11 includes an inertial mass, comprising the mass of the cover elements, which is connected to another mass, that of the intake manifold 12, through a spring, which is the flexible plate 23. Since both masses are free to move in space but are interconnected by a spring element, they will vibrate together and will display, at least in some of their vibration modes, an interactive resonant vibration. In interactive resonant vibrations, the resonant frequency of vibration depends upon and varies with the mass of at least one of the masses connected by the spring. As illustrated in FIG. 8, two masses will vibrate with interactive resonance if one mass is not too great with respect to the other mass. Specifically, in FIG. 8, the resonant frequency of a two mass and spring system is plotted as a function of the value of the larger mass, with a constant smaller mass. It can be seen that, over a range of values for the larger mass, the resonant frequency changes with variations in that larger mass. Of course, for much larger values of the larger mass, the change becomes so small as to be negligible and the system becomes self-resonant with a single unchanging resonant frequency.

It has been discovered that the structure of the cover elements, as described with reference to FIGS. 3–5, of the sensor 11 provides sufficient mass to vibrate with interactive resonance with the intake manifold of engine 12 of engine 10. If different masses are coupled to the sensor of this invention and the resonant frequencies, as indicated by the sensor output signal, are plotted against these coupled masses, the result is similar to the left side of FIG. 8. The precise sizes and materials of the elements such as annular riser 24, top member 26, terminal member 34 and insulator 35 are not critical in determining whether the resonant vibrations will be interactive; and there is a great deal of freedom allowed in the selection of these members or even in providing alternate designs, as long as a significant mass is connected to the periphery of flexing plate 23. In addition, the mass of mounting stud 22 and flexing plate 23 should not become too great with respect to the mass of the cover elements so that the mounting stud does not isolate the cover elements from the interactive resonant vibrations. However, if plate 23 is thin enough to be a "flexing plate" for the knock frequency range and the mounting stud is a reasonable size, it would be difficult to construct a sensor with the described structure of this invention that was not interactively resonant with the manifold 12. At a later point in the specification, an example of sensor construction with suitable dimensions will be given.

The significance of the interactive resonant vibrations lies in the fact that the intake manifold 12 of engine 10 has a complex shape which exhibits many modes of vibration, each of which can be considered, in effect, as a separate mass vibrating with the cover elements of sensor 11. Each of these modes of vibration is characterized by different nodes and moving points, which implies that the effective mass vibrating with the cover elements of sensor 11 is slightly different for each mode of vibration of intake manifold 12. Since a number of different effective masses are present simultaneously in intake manifold 12, the sensor vibrates with resonant interaction with each of these effective masses. Therefore, the vibration will be characterized by a plurality of resonant frequencies which may be present at the same time. The sum of these resonant frequencies creates a plot of amplitude versus frequency such as solid curve 19 of FIG. 2. In other words, at least within a range of frequencies, no matter what the precise characteristic knock frequency of a cylinder of engine 10 may be, the manifold 12 and sensor 11 will have at least one mode of vibration which exhibits a resonance close to that frequency.

Of course, some prior art sensors may have exhibited the same interactive resonant vibration between the sensor case and the intake manifold or other engine components upon which it has been mounted. However, the designers of those sensors have always tried to isolate the resonance of the sensor to make if self-resonant by placing the piezoelectric element on a member of the sensor which does not take part in those interactive resonant vibrations. For instance, in a piezoelectric knock sensor in which the piezoelectric element is placed on a pedestal, that pedestal will vibrate with only one resonance at the same time that the case surrounding the pedestal may vibrate independently of the pedestal but in interactive resonance with the intake manifold. Only the sensor of this invention combines such resonant interactive vibration with the placement of the piezoelectric element directly on the flexing member of the sensor case to utilize that interactive resonant vibration to the utmost.

It has been assumed up until this point in the specification that the vibrations being considered are axial in nature, that is, parallel to the axis of the mounting stud, flexing plate 23 and annular riser 24. These vibrations would correspond to those vibration components in the intake manifold 12 which are essentially perpendicular to the surface at the point of attachment of sensor 11. However, other vibration components appear to be present in the intake manifold 11 which are parallel to the surface at that point; and tests have shown that these transverse vibrations contain significant knock information in many cases. With reference to FIG. 3, it can be seen that sensor 11 includes cover elements which are all connected to one side of flexing plate 23 and whose collective mass therefore has a center on the same side of flexing plate 23. Therefore, vibrations parallel to flexing plate 23 will result in vibration of the cover elements in one or more rocking modes of vibration which will also cause significant flexing in flexing plate 23. These transverse modes of vibration present additional opportunities for resonant response to knock vibrations from the different cylinders of engine 10 and thus contribute to the broad resonant response indicated in a curve such as solid line 19 of FIG. 2. The sensor may also be interactively resonant in these transverse modes.

An additional contribution to the broad resonant response of sensor 11 is the use of flexing plate 23 with the piezoelectric element 30 attached. A "plate" is distinguished from a "diaphragm" in the analysis of vibrating flat members, according to Philip M. Morse in *Vibration and Sound*, McGraw Hill, 1948, in that the dominant restoring force in the case of the plate is the stiffness of the plate material itself whereas the dominant restoring force in a diaphragm is the tension at the periphery of the diaphragm. Thus, the selection of a flexing "plate" 23 rather than a diaphragm implies a substantial stiffness in the plate; and this stiffness is reinforced by the stiffness of the piezoelectric element 30. This stiffness, as well as the damping effect of layer 31, appears to assist in the broadening of the resonant response of the sensor or perhaps in filling in between the different individual resonant frequencies. However, although the flexing plate 23 and piezoelectric element 30 are considered necessary parts of this invention, layer 31 is only one of several ways of attaching piezoelectric element 30 to flexing plate 23 and should not be a limitation of the invention.

In the design of a specific sensor 11 and a mounting for a specific intake manifold 12, several factors need to be considered. First, mounting stud 22 should be of a standard size for threading. Second, flexible plate 23 should be sufficiently thick to guarantee durability for the sensor 11 as well as provide the required stiffness, although still thin enough to allow resonance in the knock frequency range. Once these factors are taken into account, the remaining major dimensions of the sensor, namely the diameter of flexing plate 23 and height of annular riser 24, are selected to provide the proper spring rate for flexing plate 23 and mass for the cover elements of sensor 11. The diameter of the piezoelectric element 30 is also chosen (greater than the diameter of the mounting stud 22) to provide sufficient output amplitude as previously suggested.

The sensor of this invention appears, from the testing that has been accomplished, to be a universal sensor in the sense that it can be applied without change of dimension to practically any multicylinder internal combustion engine of the type typically found in mass produced motor vehicles. However, for a particular engine-manifold configuration, it is necessary to provide a mounting boss or other means for the manifold which not only provides for a threaded fitting for the sensor but also tunes the sensor-manifold combination to the range of knock frequencies inherent in that engine. In other words, the sensor itself provides broad resonance frequency range; however, that range may be shifted to the precise frequency region desired by proper design of the mounting member or boss of the intake manifold or other engine component. This design need be accomplished only once for each engine-manifold configuration; and good results will be obtained for any combination of particular samples of said engine, manifold and sensor.

A typical mounting boss for the intake manifold 12 is shown in FIG. 6 with a knock sensor 11 according to this invention threaded into said mounting boss. Mounting boss 40 is shown as being attached or cast into the wall of intake manifold 12 and provided with an internally threaded opening 41 for the insertion of mounting stud 22 of sensor 11. The location of mounting boss 40 on intake manifold 12 is chosen to be that location which receives vibrations well from all the various cylinders; while the choice of dimensions for mounting boss 40 and intake manifold wall thickness adjacent boss 40 determine the tuning of the sensor-manifold combination.

An alternate method of tuning the sensor manifold combination is shown in FIG. 7. In this case, the sensor is mounted on a specially shaped insert 43, which replaces boss 40. Insert 43 is given a regular shape such as a cylindrical pill box to make tuning more predictable and easier for each engine-manifold configuration. The cylindrical annular side 44 of insert 43 is given a comparatively large thickness. Such dimensions as the diameter of the annulr side 44, diameter of the mounting boss 47, height of the mounting boss 47 and thickness of the top member 45 combine in a manner more predictable than that of mounting boss 40 to tune the resonant frequency range of the sensor manifold combination.

One particular embodiment of sensor 11 has been constructed with the following dimensions: outer diameter of riser 24—3.8 cm; height of riser 24—1.5 cm; thickness of riser 24 and flexing plate 23—0.254 cm; piezoelectric element—1.25 mm (0.050 in) thick, 2.54 cm diameter; stud 22—¼ NPT, outer diameter 1.36 cm at plate 23, height 1.28 cm. However, these dimensions may be varied considerably without losing the advantages of this sensor. For example, the outer diameter of riser 24 has been varied from 1 inch (2.54 cm) to 2 inches (5.08 cm); and the height of riser 24 has been varied from 0.5 inch (1.27 cm) to 2 inches (5.08 cm). The unique operation of the sensor of this invention appears to result from the structure itself and is not dependent, in a practical sense, on any critical dimensions, although those general considerations stated at other points in this specification should be heeded.

Figure 11:
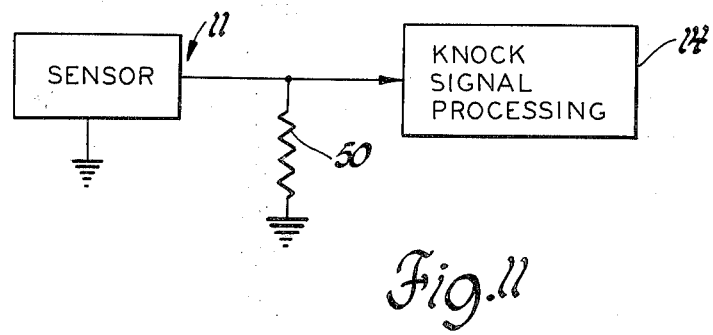
FIG. 11 is a schematic and block diagram showing an optional shunting resistor for the system of FIG. 1.

The output signal from sensor 11 is significantly greater in amplitude than that of a magnetostrictive sensor. A benefit of this is that, as shown in FIG. 11, sensor 11 may be shunted by a resistor 50 to ground having a comparatively small impedance of 1,000 ohms. This provides protection from electromagnetic interference at the sensor output and thus reduces the need for an expensive shielded cable between the sensor 11 and knock signal processing circuit 14.

In addition to the embodiments described herein, other embodiments of this invention will occur to those skilled in the art. Therefore, this invention should be limited only by the claims which follow.

The embodiments of the invention in which an exclusive property or privilege is claimed are defined as follows:

1. An engine knock sensor adapted to be mounted on a component of a multicylinder, internal combustion engine capable of generating knock-induced vibrations at frequencies which may differ slightly from cylinder to cylinder and respond interactively with at least a portion of said component to knock vibrations from all the different cylinders, comprising, in combination:
   a flexing plate adapted to execute plate vibrations in a plurality of modes;
   a substantially rigid mounting stud affixed to and extending substantially perpendicularly from the flexing plate and adapted for threaded attachment to the engine component;

a cover affixed to the flexing plate about its periphery for unitary movement with said periphery and having a mass adapted to interact with the engine component through the flexing plate to execute interactive resonant vibrations therewith over a substantial frequency range at least equal to the range of varying frequencies characteristic of knock vibrations of all the different cylinders, the mass of the cover having a center not corresponding with the center of mass of the flexing plate, whereby the cover and engine component vibrate resonantly through the flexing plate in modes transverse as well as axial with respect to the mounting stud; and a piezoelectric element attached to the flexing plate under the cover, the element covering a substantial portion of the flexing area of the flexing plate and being thereby effective to flex therewith and generate an electrical output signal in response to the axial and transverse resonant vibrations of the sensor with the engine component, the sensor thereby being capable of exhibiting resonant response to knock vibrations for all cylinders of a multicylinder engine and generating a strong output signal in response thereto.

2. An engine knock sensor adapted for mounting on a component of a multicylinder, internal combustion engine and capable of responding interactively with at least a portion of the component to knock vibrations from all the cylinders of the engine, the engine cylinders being capable of generating knock-induced vibrations at frequencies which may differ slightly among the individual cylinders, the sensor comprising, in combination:

a case comprising a generally cylindrical member, a generally circular flexing plate coaxial with the cylindrical member and attached at its periphery to one end of the cylindrical member for unitary movement of said periphery and said cylindrical member and for closure of the one end, the case further comprising elements effective to close the other end of the cylindrical member;

a generally cylindrical rigid mounting stud threaded for attachment to the engine component and attached coaxially to the flexing plate outside the case, the mounting stud having a diameter smaller than that of the cylindrical member, the mounting stud being thereby effective, when attached to the engine component, to couple the cylindrical member and further elements through the flexing plate to the engine component for interactive vibration therewith, the combined mass of the cylindrical member and further elements being effective thereby to produce interactive resonance with the engine component and further to cause flexure of the flexing plate in modes transverse as well as parallel to the axis thereof, whereby the sensor is capable of resonant response over a broad frequency range to knock vibrations from all the cylinders of the engine;

a generally circular piezoelectric element having a diameter greater than that of the mounting stud and being attached coaxially within the case to the flexing plate for flexure therewith, whereby the piezoelectric element responds to resonant vibrations of the sensor to generate a strong electrical output signal in response to knock from any of the cylinders of the engine.

* * * * *